(12) United States Patent
Filiz et al.

(10) Patent No.: US 9,680,975 B2
(45) Date of Patent: Jun. 13, 2017

(54) ELECTRONIC DEVICE WITH REWORKABLE MIDPLATE ATTACHMENT STRUCTURES

(71) Applicant: Apple Inc., Cupertino, CA (US)

(72) Inventors: Sinan Filiz, Cupertino, CA (US); Richard M. Comer, Foster City, CA (US); Romain A. Teil, San Francisco, CA (US); Sawyer I. Cohen, Sunnyvale, CA (US); Steven J. Martisauskas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 576 days.

(21) Appl. No.: 14/029,330

(22) Filed: Sep. 17, 2013

(65) Prior Publication Data

US 2015/0077909 A1    Mar. 19, 2015

(51) Int. Cl.
*G06F 1/16* (2006.01)
*H04M 1/02* (2006.01)

(52) U.S. Cl.
CPC ............ *H04M 1/0266* (2013.01); *G06F 1/16* (2013.01); *Y10T 29/49718* (2015.01); *Y10T 29/49826* (2015.01)

(58) Field of Classification Search
CPC ........ G06F 1/1626; G06F 1/1656; G06F 1/16; H05K 5/03; H05K 3/34; H05K 3/341; H05K 5/0017; H05K 5/0217; Y10T 29/49144; Y10T 29/49149; Y10T 29/49179; Y10T 29/49718; Y10T 29/49826; H01R 43/02; H04M 1/0266

USPC ............ 361/679.01, 679.09, 679.5–679.585; 455/575.1–575.4; 312/223.1–223.2; 29/428

See application file for complete search history.

(56) References Cited

U.S. PATENT DOCUMENTS

| | | | |
|---|---|---|---|
| 7,911,775 B2 | 3/2011 | Azami | |
| 8,319,911 B2* | 11/2012 | Dai | G06F 1/1637 349/58 |
| 8,531,842 B2 | 9/2013 | Johnson et al. | |
| 8,537,543 B2 | 9/2013 | Wang et al. | |
| 2005/0285991 A1* | 12/2005 | Yamazaki | G02F 1/133308 349/58 |
| 2006/0125364 A1 | 6/2006 | Takeda et al. | |

(Continued)

*Primary Examiner* — Anthony Haughton
*Assistant Examiner* — Ingrid Wright
(74) *Attorney, Agent, or Firm* — Treyz Law Group, P.C.; G. Victor Treyz; Kendall W. Abbasi (57) ABSTRACT

An electronic device may be provided with a display mounted in a display frame assembly that includes a plastic structure overmolded over a display frame. A housing midplate may be used to provide the electronic device with mechanical rigidity and strength, and may also be used as a sensor plane. For sensor plane applications, accurate placement and assembly of the midplate in the housing can be critical. The housing midplate may be accurately assembled to the display frame using connections formed using welded tabs, welded and screwed nuts, overmolded plastic heat stake structures, or overmolded plastic structures and adhesive. Rework and repair operations may be performed by disconnecting connections such as welds using cutting equipment, by using solvent to dissolve adhesive, by unscrewing welded nuts, or by removing heat stake structures. Following rework or repair, a fresh midplate and associated components may be attached to the display frame.

20 Claims, 9 Drawing Sheets

(56) References Cited

U.S. PATENT DOCUMENTS

2009/0257189 A1* 10/2009 Wang ................. H04M 1/0249
361/679.56
2010/0226118 A1* 9/2010 Baar .................... G02B 6/0028
362/97.1
2012/0242926 A1 9/2012 Hsu et al.
2012/0287356 A1 11/2012 Nonaka
2014/0152890 A1* 6/2014 Rayner ................. G06F 1/1626
348/376

* cited by examiner

ELECTRONIC DEVICE WITH REWORKABLE MIDPLATE ATTACHMENT STRUCTURES

BACKGROUND

This relates generally to electronic devices and, more particularly, to mounting structural components within an electronic device housing.

Electronic devices often include internal structures for providing added strength to device housings. For example, some cellular telephones include a planar internal metal structure to help stiffen the cellular telephone housing. Planar internal metal structures of this type are sometimes referred to as midplates. Midplates can be mounted within a housing using screws. A hole in a midplate may accommodate a screw that is used to fasten the midplate to a mating housing structure. When it is desired to rework or repair a device, screws can be unscrewed by a technician. Although screws allow for rework, reliance on holes and screws for proper alignment between the midplate and the mating housing structures can introduce alignment inaccuracies and movement of the midplate over the lifetime of a device. This can lead to performance issues for components that rely on accurate midplate placement.

It would therefore be desirable to be able to provide improved ways to mount structural components within an electronic device housing.

SUMMARY

An electronic device may be provided with a display. The display may be received within a display frame assembly that includes a plastic structure overmolded over a display frame. A housing midplate may be used to provide the electronic device with mechanical rigidity and strength, and may also be used as a sensor plane. For sensor plane applications, accurate placement and assembly of the midplate in the housing is critical. The housing midplate may be accurately assembled to the display frame using connections formed using welded tabs, welded and screwed nuts, overmolded plastic heat stake structures, or overmolded plastic structures and adhesive.

Rework and repair operations may be performed by removing permanent connections such as welds using cutting equipment, by using solvent to dissolve adhesive, by unscrewing welded nuts, by removing heat stake structures, or using other techniques. Following rework or repair, repaired structures may be reattached to the display frame assembly or a fresh midplate and new components may be attached to the display frame assembly.

DETAILED DESCRIPTION

Electronic devices may be provided with housings. Components such as displays, sensors, buttons, batteries, and other electronic components may be mounted in a device housing. To enhance structural strength, it may be desirable to incorporate internal housing structures such as planar metal structures into an electronic device. For example, housing rigidity and strength may be enhanced by incorporating a metal midplate into an electronic device. The midplate may be a planar sheet metal structure that runs parallel to front and rear surfaces of the electronic device. The electronic device may be a handheld electronic device such as a cellular telephone or may be other electronic equipment. The midplate and housing structures to which the midplate is mounted may be configured to facilitate rework and repair. If, for example, a defective part is detected during device manufacturing that is associated with the midplate or that is blocked by the midplate, the midplate may be removed and the part repaired or replaced. The original midplate or a replacement midplate may then be installed in the device.

Figure 1:
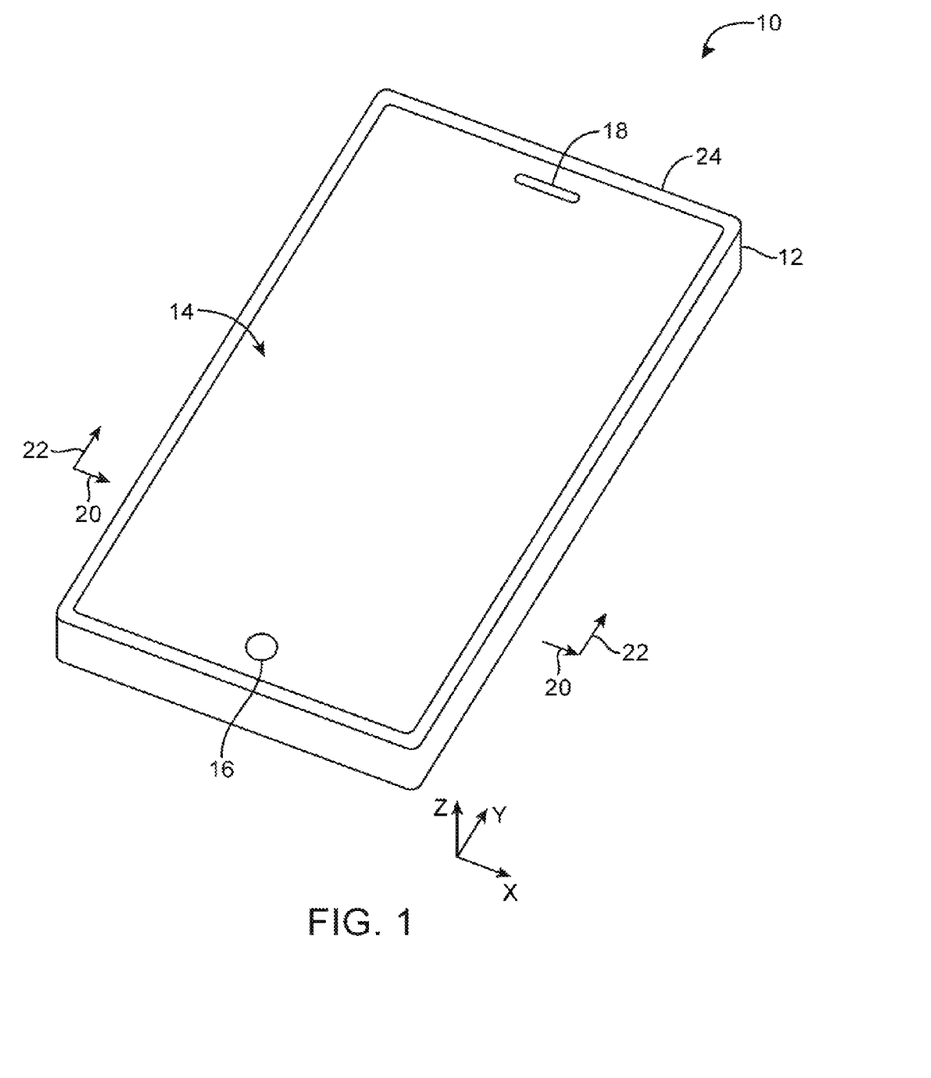
FIG. 1 is a perspective view of an illustrative electronic device such as a handheld computing device in accordance with an embodiment.

An illustrative electronic device of the type that may be provided with a display is shown in FIG. 1. An electronic device such as electronic device 10 of FIG. 1 may be computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

Device 10 may have one or more displays such as display 14 mounted in housing structures such as housing 12. Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable display pixel structures such as organic light-emitting diode display pixels, electrophoretic display pixels, plasma display pixels, etc.

A display cover layer may cover the surface of display 14 or a display layer such as a color filter layer (e.g., a layer formed from a clear substrate covered with patterned color filter elements) or other portion of a display may be used as the outermost (or nearly outermost) layer in display 14. The outermost display layer may be formed from a transparent glass sheet, a clear plastic layer, or other transparent member. If desired, openings may be formed in the outermost layer of display 14 to accommodate components such as button 16 and speaker port 18 of FIG. 1 (as examples). Buttons, connector ports, and other structures may also be accommodated using openings in housing 12.

Figure 2:
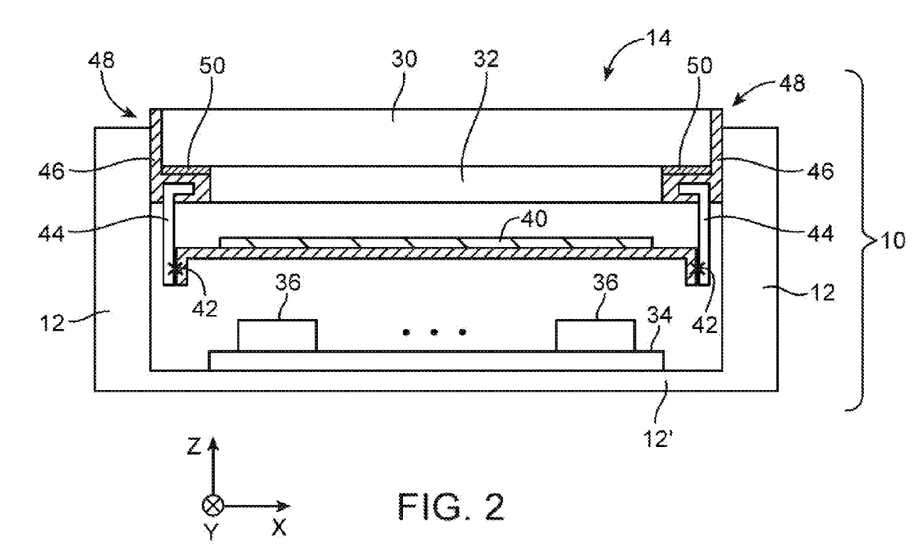
FIG. 2 is a cross-sectional side view of an illustrative electronic device with a midplate in accordance with an embodiment.

A cross-sectional side view of electronic device 10 of FIG. 1 taken along line 20 of FIG. 1 and viewed in direction 22 of FIG. 1 is shown in FIG. 2. As shown in FIG. 2, display 14 may include outer display layer 30 and inner display layers 32. Outer display layer 30 of display 14 may be a layer of clear glass or plastic. For example, display layer 30 may be a display cover glass layer or other transparent display cover layer. Layers 32 may form a liquid crystal display, an organic light-emitting diode display, a plasma display, an electrophoretic display, or other display. For example, layers 32 may include liquid crystal display layers such as a layer of liquid crystal material interposed between a color filter layer and a thin-film transistor layer and sandwiched between opposing upper and lower polarizers. If desired, the color filter layer or thin-film transistor layer may be used in place of display cover layer 30. Configurations for display 14 in which display 14 has a display cover layer are sometimes described herein as an example. Display layers 32 are sometimes referred to as forming a display module or display for device 10.

Device 10 may include internal components 36 mounted on one or more substrates such as substrate 34. Internal components 36 may include integrated circuits, sensors, switches, connectors, and other electronic components. Substrate 34 may be a printed circuit board or other substrate. For example, substrate 34 may be a rigid printed circuit board formed from a material such as fiberglass-filled epoxy or may be a flexible printed circuit board such as a flex circuit formed from a sheet of polyimide or a layer of other flexible polymer.

Display 14 (e.g., display cover layer 30 and/or display layers 32) may be mounted on a front face of device 10. Housing portion 12' may form a parallel rear housing wall. Housing portion 12' may be formed as an integral portion of other portions of housing 12 (e.g., housing sidewalls) or the sidewalls and rear housing portion 12' of housing 12 may be formed from separate members that are attached to each other using adhesive, fasteners, or other attachment techniques.

Structural support for device 10 may be provided by one or more internal housing structures such as midplate 38. Midplate 38 may be a planar structure that lies in a plane parallel to the front and rear faces of device 10. Midplate 38 may, for example, lie at a location that is between rear housing wall 12' and display 14 (layers 30 and/or 32) on the front face of device 10. Midplate 38 may be a plate or other planar structure formed from one or more sheet metal members that are optionally overmolded with plastic structures. The presence of midplate 38 may help provide device 10 with rigidity and strength. For example, the presence of midplate 38 may provide device 10 with resistance to undesired flexing (e.g., twisting, etc.).

If desired, components such as component 40 may be mounted on the upper surface of midplate 38 and/or may be mounted on the lower surface of midplate 38. Component 40 may be a battery, a switch, an audio component such as a speaker driver or microphone, may be a vibrator, may be a connector, may be a camera, may be a light-emitting diode, may be a sensor (e.g., a capacitive touch sensor, a proximity sensor, an ambient light sensor, etc.), or may be another suitable electronic component. The successful operation of component 40 may benefit from accurate placement of component 40 in lateral dimensions X and Y and may also benefit from accurate placement of component 40 in vertical dimension Z.

In configurations in which components such as component 40 are supported by midplate 38, accurate midplate placement may help ensure that the components will be located accurately with respect to the front and/or rear face of housing 12. Component performance may be adversely affected by placement too close or far from other structures in device 10. Accurate midplate placement within device 10 is therefore helpful for ensuring satisfactory operation of components such as component 40 in device 10. Accurate midplate placement will also help ensure that nearby components such as antennas and other devices that are potentially affected by midplate placement will function properly. Midplate placement may also affect the way in which mechanical components in device 10 interact with each other. For example, inaccurate midplate placement may weaken the mechanical strength of device 10.

Accurate midplate placement can be achieved by adjusting the position of midplate 38 within device 10 using computer-controlled positioners (or manually). Sensors such as a camera, light sensors, laser-based sensors, and other equipment for monitoring the position of midplate 38 relative to other structures in device 10 may be used in gathering information on the placement of midplate 38 in real time. Once a desired position has been achieved for midplate 38, connections 42 (e.g., welds, screws, other fasteners, solder, adhesive, heat stakes, or other attachment mechanisms) may be used to secure midplate 38 within device 10.

In the example of FIG. 2, display 14 is mounted in display frame assembly 48 using adhesive 50 to form a display assembly. Frame assembly 48 may be formed from plastic, metal, fiber composite material, or other materials. For example, frame assembly 48 may be formed from plastic frame structure 46 that have been overmolded onto metal frame 44. Connections 42 may be used to attach midplate 38 to metal frame 44 in frame assembly 48. Connections 42 may include welds, screws or other fasteners, solder, heat stakes, adhesive, or other attachment mechanisms. Welding equipment or other assembly equipment may be used to form connections 42 after sensor equipment determines that midplate 38 has been positioned in a desired location within device 10 (i.e., a desired position with respect to frame 44 in the display assembly).

During manufacturing, tests may be performed on fully and partially assembled devices 10. If a faulty component or other defect is detected in device 10, device 10 can be scrapped or reworked. In some situations, device 10 may experience an unexpected component failure in the field and may need to be repaired. During rework and repair operations such as these, it may be desirable to remove midplate 38 from housing 12. For example, it may be difficult or impossible to repair a component such as component 40 while component 40 and midplate 38 are installed within housing 12 because midplate 38 blocks component 40. Once the repair is complete, however, midplate 38 or a replacement midplate will once again need to be accurately installed within device 10.

The process of temporarily removing midplate 38 from device 10 and housing 12 to facilitate rework and repair typically involves disconnecting connections 42. This may be accomplished by cutting (e.g., using a laser, a mechanical cutting device, etc.), by unscrewing screws or otherwise detaching detachable fasteners, using solvent to dissolve adhesive, using heat, or by otherwise detaching midplate 38 from frame 44 and other structures associated with device 10. As an example, a welded portion of midplate 38 and frame 44 may be removed using a cutter or a screw-based connection between midplate 38 and frame 44 may be unscrewed. Following repair or replacement of faulty structures (e.g., faulty components such as component 40), the removed midplate or a replacement midplate may be reinstalled within device 10. Accurate placement of the midplate following rework or repair operations may be ensured using position sensors and real time control of the position of midplate 38 using computer-controlled positioners. New connections 42 may then be formed to secure the midplate 38.

Midplate 38 may, in general, be attached to any portion of device 10 such as inner portions of housing walls 12, portions of a front or rear surface of housing 12, frame structures or brackets attached to housing sidewalls or front or rear housing surfaces, or other structural elements (housing structures) in device 10. Configurations in which midplate 38 is attached to frame 44 of display frame assembly 48 are sometimes described herein as an example.

Midplate 38 and frame assembly 48 may have features that facilitate attachment of midplate 38 and frame assembly 48. For example, midplate 38 and frame assembly 48 may have mating tabs or other protrusions. This type of arrangement is shown in the perspective view of illustrative midplate 38 and frame assembly 48 of FIG. 3. In the illustrative configuration of FIG. 3, midplate 38 has protrusions such as bent tabs 38T. Display frame assembly 48 includes metal frame 44 and overmolded plastic structures 46. As indicated by dashed lines 44', metal frame 44 may have a rectangular ring shape with a central rectangular opening. Overmolded plastic structures 46 may have a rectangular ring shape. Protrusions such as tabs 44T of frame 44 may be configured to mate with corresponding tabs 38T on midplate 38. Overmolded plastic structures 46 may cover the rectangular ring portion of frame 44, while allowing tabs 44T to protrude.

Figure 3:
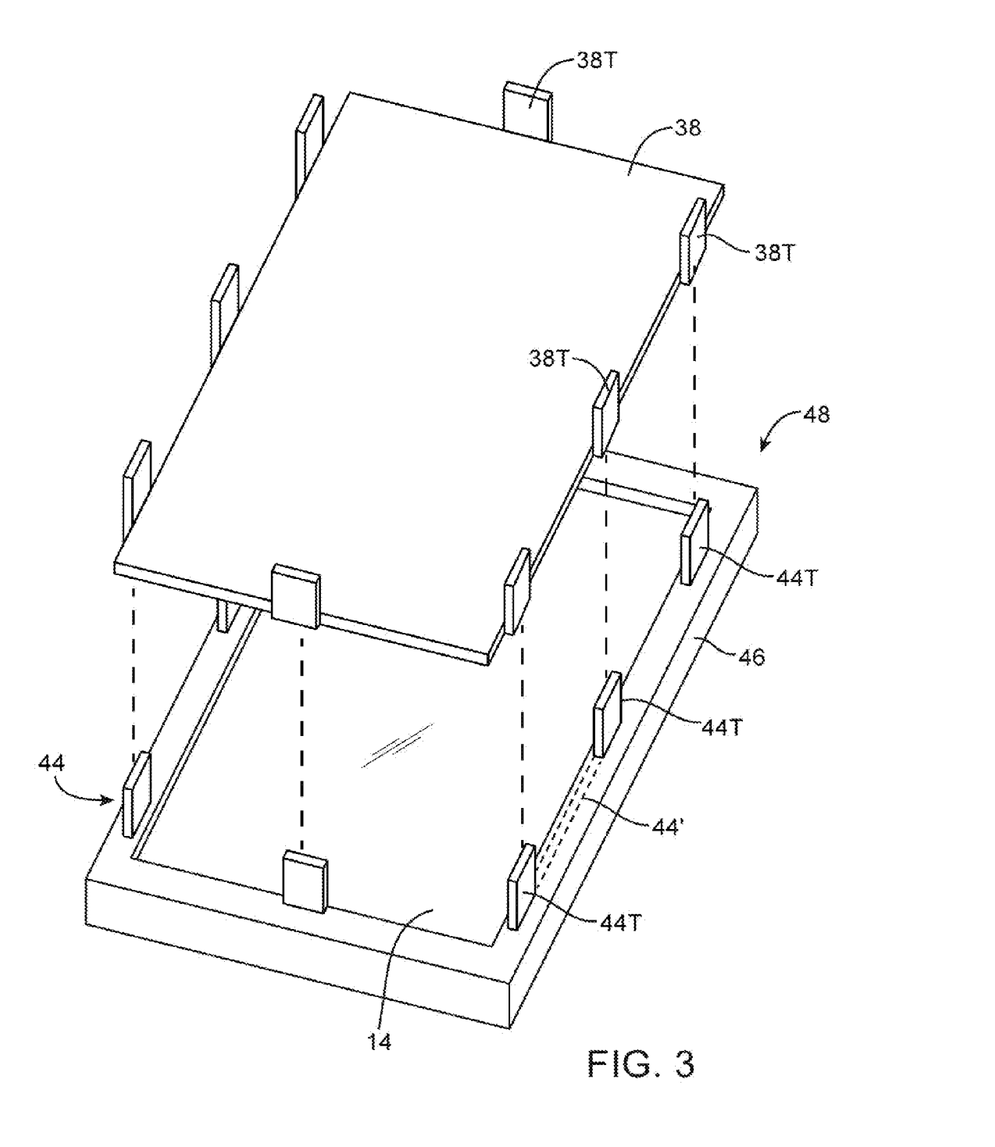
FIG. 3 is an exploded perspective view of a display assembly and a midplate that may be joined to form a display module in accordance with an embodiment.

In the arrangement shown in FIG. 3, display 14 has been received within the central rectangular opening within frame assembly 48 to form a display assembly. During assembly operations, the display assembly may be positioned so that tabs 44T of frame 44 mate with tabs 38T of midplate 38. A camera, laser-based sensor, and/or other sensors may be used to ensure that the display assembly and midplate 38 are positioned accurately with respect to each other. Connections 42 (FIG. 2) may then be formed using welding or other attachment techniques. The resulting structure, which may sometimes be referred to as a display module, includes frame 44 and plastic structures 46 of frame assembly 48, includes display 14, and includes midplate 38. The display module may then be installed within housing 12 of device 10. In this example, the position of midplate 38 is accurately determined with respect to display 14, so components such as component 40 that are mounted on midplate 38 will have an accurately defined separation from nearby components such as display 14. This may help ensure that device 10 operates properly (e.g., in configurations in which the performance of component 40 can be affected by the separation between component 40 and display 14). Display 14 is mounted on the front surface of device 10, so the accurate placement of midplate 38 results in accurate placement of component 40 relative to the front face of device 10 and can also help control the placement of component 40 and midplate 38 relative to structures in device 10 that are coupled to display 14 such as housing 12.

Connections 42 may be formed by welding equipment, soldering equipment, equipment for installing fasteners such as screws, equipment for applying and curing adhesive, equipment for forming heat stakes, or other tools for attaching structures together in device 10. Consider, as an example, the system of FIG. 4. In the illustrative system of FIG. 4, a sensor such as sensor 51 is being used to monitor the relative positions of two structures that are being attached to each other such as tab 44T of frame 44 and tab 38T of midplate 38. Sensor 51 may be a digital image sensor (e.g., a camera), may be a photodiode, may be a laser-based optical sensor, may be switch or other mechanical position sensor, may include acoustic range-finding devices, may include magnetic sensors, contact sensors, resistive sensors, or other sensors for detecting and measuring the position of objects. Computer-controlled positioning equipment may be used to adjust the relative position between frame 44 and midplate 38. For example, computer-controlled positioner 56 may be used to adjust the position of frame 44 and computer-controlled positioner 58 may be used to adjust the position of midplate 38. Sensor 51 may be used to provide information on the positions of frame 44 and/or midplate 38 during operation of the computer-controlled positioning equipment.

Figure 4:
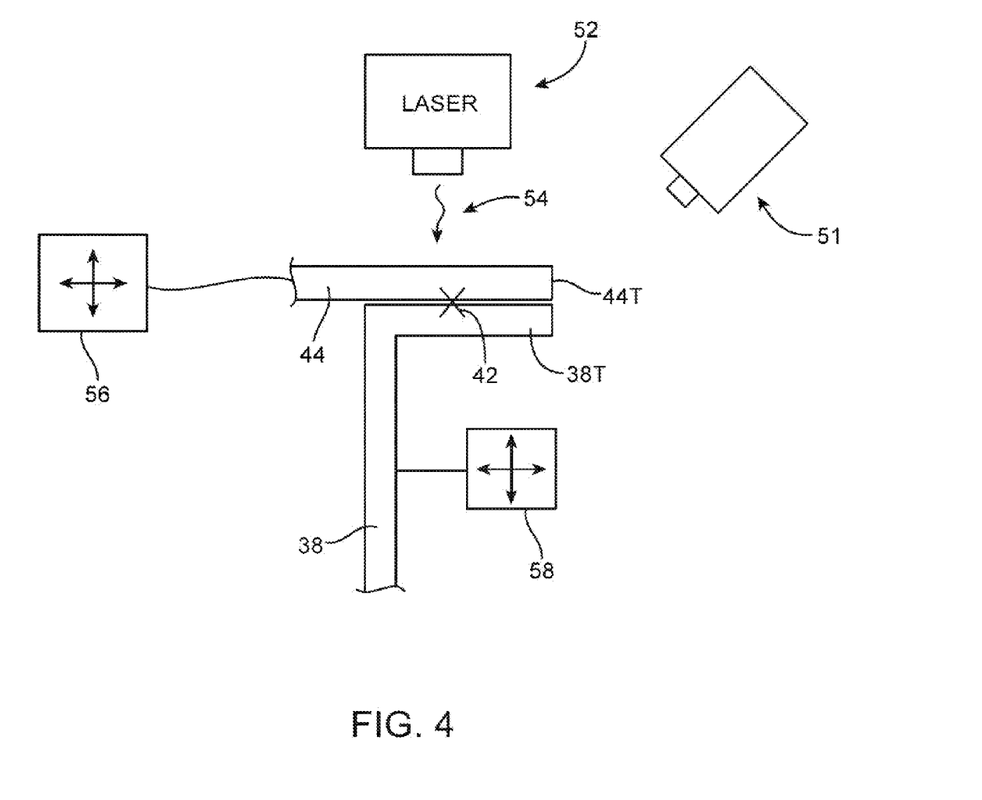
FIG. 4 is a cross-sectional side view of a midplate member and associated display frame that are being jointed using equipment such as a laser welding tool in accordance with an embodiment.

Once frame 44 and midplate 38 have been positioned as desired (i.e., once the desired relative position of midplate 38 with respect to frame 44 has been achieved), connection forming equipment 52 may be used to form connections 42. Connection forming equipment 52 may be equipment for screwing a screw or for forming an attachment using a rivet, may be adhesive dispensing equipment for dispensing and curing adhesive, may be equipment for forming a solder joint, may be equipment for forming a heat stake, or may be equipment for forming a welded connection. For example, equipment 52 may be a laser for producing laser light 54 that welds frame 44 to midplate 38. Other techniques for welding or otherwise attaching first and second respective metal structures in device 10 together may be used if desired (e.g., friction welding, arc welding, gas welding, etc.).

Figure 5:
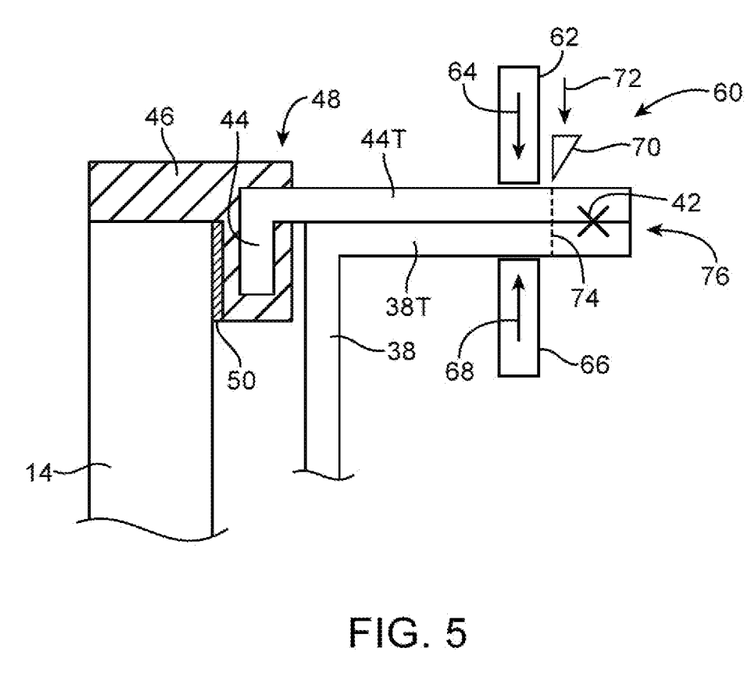
FIG. 5 is a cross-sectional side view of a portion of an electronic device in which a welded connection or other permanent connection between a midplate member and associated display frame is being trimmed off to permit rework of the electronic device in accordance with an embodiment.

During subsequent testing or during use by a user in the field, faults may be detected in components such as component 40 that require rework or repair. To disconnect connection 42, it may be desirable to cut away a portion of the structures that were welded together (as an example). FIG. 5 is a cross-sectional side view of the attached structures of FIG. 4 during an illustrative weld removal process. In the example of FIG. 5, midplate 38 was previously connected to frame 44 of display frame assembly 48 using connection 42. Connection may be a weld or other permanent connection (i.e., a connection of the type that cannot be easily reversed as would be the case when unscrewing a screw). Because connection 42 (in this example) is an irreversible connection, connection removal equipment 60 is being used to cut off the portion of the structures that are connected using connection 42.

Connection removal equipment 60 may include a cutter such as cutter 70. Cutter 70 may have one or more blades or other structures for cutting metal (as an example). Connection removal equipment 60 may include a clamp formed from clamp members such as clamp member 62 and clamp member 66. When it is desired to remove connection 42, equipment 60 may use computer-controlled positioners to move clamp member 62 in direction 64 and to move clamp member 66 in direction 68. By moving clamp members 62 and 64 together in this way and thereby closing the clamp, equipment 60 may grip tab 44T of frame 44 and tab 38T of midplate 38. While tab 44T and tab 38T are being held in position by equipment 60, equipment 60 may use a computer-controlled positioner to move cutter 70 in direction 72, thereby forming cut 74 through tab 44T and tab 38T. This cuts away tip portion 76 of tab 44T and tab 38T, so that connection 42 (i.e., the weld between frame 44 and midplate 38) may be removed. Once cut 74 has been formed and the portion of the display module that contains weld 42 has been removed (and once all other such welds 42 on the other tabs have been likewise removed), midplate 38 will be unrestrained by welds 42 and will be free to move relative to frame 44. This allows midplate 38 to be removed from frame assembly 48 and the other structures in the display module.

Reworkable and repairable device structures may be based on welds that can be cut away from midplate 38, may be based on solder joints that can be reworked by application of heat, may be based on screws and other removable fasteners, may be based on adhesive joints, may be based on heat stake connections, or may be based on other types of connections 42. FIGS. 6, 7, 8, and 9 show illustrative connections 42 that may be formed between midplate 38 and frame 44. The configurations of FIGS. 6, 7, 8, and 9 allow midplate 38 to be accurately located relative to frame 44 (e.g., using sensors and computer-controlled positioners) before connections 42 are formed.

Figure 6:
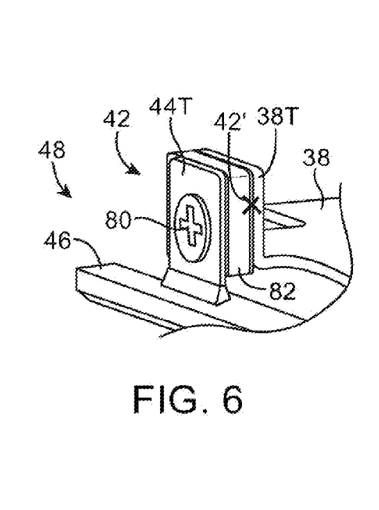
FIG. 6 is a perspective view of an illustrative reworkable coupling arrangement based on welded nuts for coupling a midplate and a display frame in an electronic device in accordance with an embodiment.

In the example of FIG. 6, connection 42 has been formed from a welded nut. Nut 82 may be, for example, a metal nut that is welded to midplate 38 using weld 42'. During assembly, screw 80 may be screwed into a threaded opening in nut 82, thereby attaching nut 82 to tab 44T on frame 44 in frame assembly 48. Following attachment of nut 82, sensor equipment 51 and positioning equipment such as computer-controlled positioners 56 and 58 (FIG. 4) may be used to accurately position midplate 38 relative to display frame assembly 48 and tab 44T of frame 44. When midplate 38 has been positioned as desired, welding equipment 52 (FIG. 4) may be used to form weld 42' between nut 82 and tab 38T of midplate 38. To rework this type of connection in the case of a non-functioning midplate 38, screw 80 can be unscrewed and midplate 38 (and its attached nut 82) may be removed. With this rework functioning display frame assembly 48 is saved. A new fresh nut 82 is screwed to the tab 44T, and a new fresh midplate 38 is welded to the nut.

Figure 7:
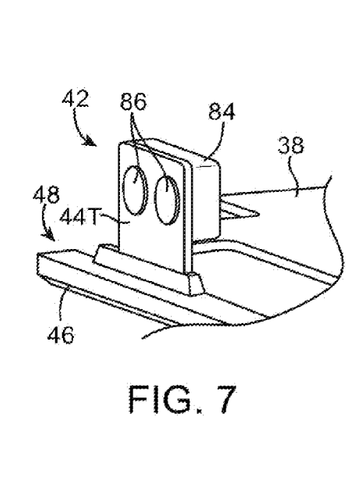
FIG. 7 is a perspective view of an illustrative reworkable coupling arrangement based on heat stakes for coupling a midplate and a display frame in an electronic device in accordance with an embodiment.

In the example of FIG. 7, connection 42 has been formed using a heat stake arrangement. Plastic heat stake structure 84 is overmolded over a prong (tab) of midplate 38. Structure 84 may have protruding heat stakes 86. Tab 44T of frame 44 in frame assembly 48 has openings such as circular holes that mate with the protruding heat stakes 86. The openings are preferably larger in diameter than the diameter of the heat stakes, allowing movement between midplate 38 and frame assembly 48 before the heat stake connections are formed. The heat stakes initially have narrow (unflared) ends that are inserted through the holes in tab 44T. Following insertion of the unflared ends of heat stakes 86, sensor equipment 51 and positioning equipment such as computer-controlled positioners 56 and 58 (FIG. 4) may be used to accurately position midplate 38 relative to display assembly 48 and tab 44T of frame 44. When midplate 38 has been positioned as desired, a heated metal bar or other heat source may be used to flare the ends of heat stakes 86, thereby attaching midplate 38 to frame 44 in a desired position. To rework connection 42 of FIG. 7, heat stakes 86 may be cut away using a blade, using additional heat application, using machining equipment, or using other cutting or plastic removal equipment. A new midplate 38 with a correspondingly new overmolded heat stake structure 84 may then be attached to frame assembly 48.

Figure 8:
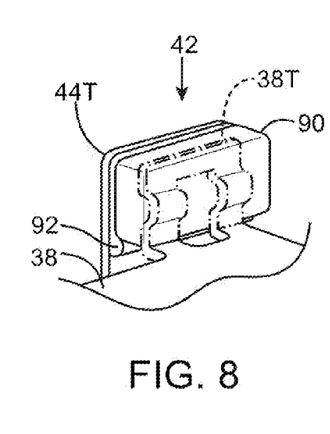
FIG. 8 is a perspective view of an illustrative reworkable coupling arrangement based on adhesive for coupling a midplate and a display frame in an electronic device in accordance with an embodiment.

FIG. 8 is a perspective view of an illustrative connection 42 that has been formed using adhesive. As shown in FIG. 8, overmolded plastic structure 90 may be overmolded on top of a bent tab portion of midplate 38. Adhesive 92 may then be used to attach structure 90 and attached midplate 38 to tab 44T of frame 44. Adhesive 92 may be a liquid adhesive such as ultraviolet light cured epoxy (as an example). Plastic structure 90 may be transparent to ultraviolet light (and potentially visible light). During assembly operations, uncured adhesive 92 may be placed between overmolded plastic structure 90 and tab 44T. Sensor equipment 51 and positioning equipment such as computer-controlled positioners 56 and 58 (FIG. 4) may then be used to accurately position midplate 38 relative to tab 44T of frame 44. When midplate 38 has been positioned as desired, an ultraviolet light source may be used to shine ultraviolet light through structure 90 onto adhesive 92, thereby curing adhesive 92 and attaching midplate 38 to frame 44. If desired, heat may be applied to cure adhesive 92 in addition to or instead of applying ultraviolet light. Solvents may be applied to adhesive 92 or cutting techniques or other mechanical techniques may be used to break connection 42 for rework or repair.

Figure 9:
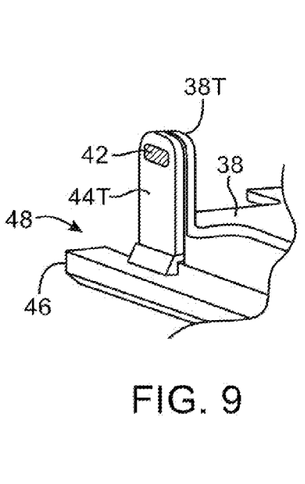
FIG. 9 is a perspective view of an illustrative reworkable coupling arrangement based on welds for coupling a midplate and a display frame in an electronic device in accordance with an embodiment.

FIG. 9 is a perspective view of midplate 28 and frame assembly 48 in which connection 42 has been formed by welding tab 44T to tab 38T as described in connection with FIG. 4. Rework and repair operations may be facilitated by cutting away connection 42 as described in connection with FIG. 5.

Figure 10A:
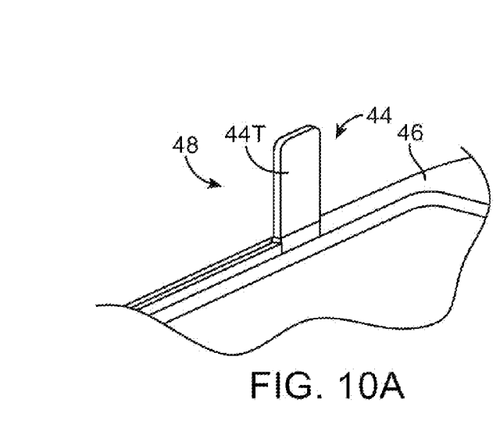
FIG. 10A is a perspective view of a portion of an illustrative display frame assembly in accordance with an embodiment.
Figure 10B:
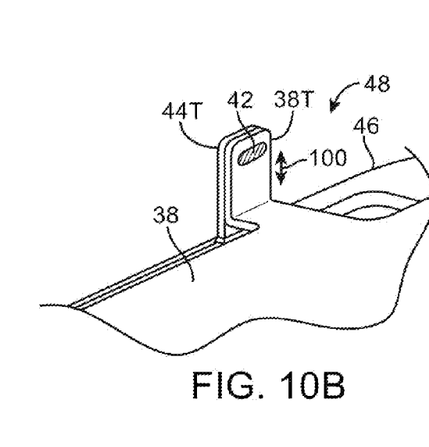
FIG. 10B is a perspective view of a portion of the illustrative display frame assembly of FIG. 10A being welded to a midplate in accordance with an embodiment.
Figure 10C:
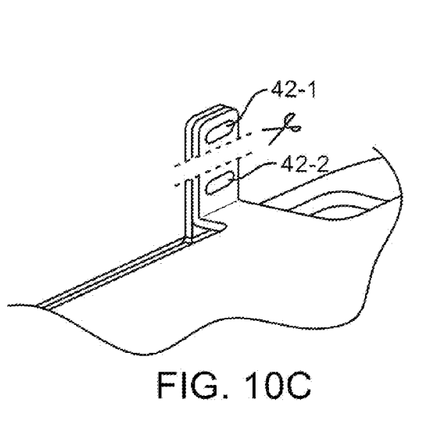
FIG. 10C is a perspective view of a portion of the illustrative display frame assembly and midplate of FIG. 10B during a weld trimming process to facilitate rework in accordance with an embodiment.

FIGS. 10A, 10B, and 10C illustrate the process of forming and removing a connection such as a weld. As shown in FIG. 10A, frame assembly 48 is initially formed by overmolding plastic frame material 46 over frame 44 so that frame tab 44T protrudes outwards from material 46. As shown in FIG. 10B, midplate 38 may then be accurately positioned relative to frame 44 by adjusting the location of midplate 38 in dimensions such as vertical dimension 100 (and, if desired, horizontally) before forming weld 42. When rework or repair is required, weld 42 can be cut away (see, e.g., cut-away weld 42-1 of FIG. 10C) and, following rework or repair, a replacement weld 42 can be formed (see, e.g., replacement weld 42-2 of FIG. 10C).

Figure 11A:
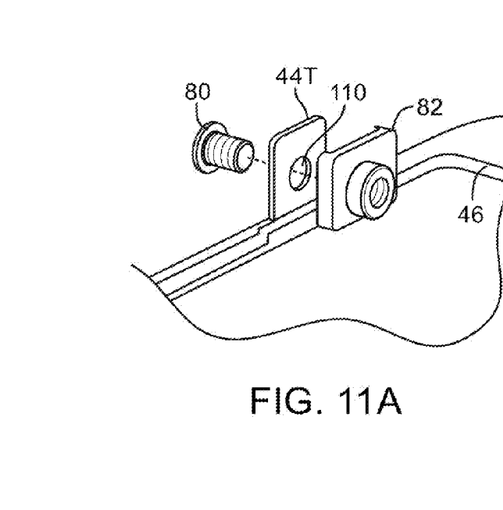
FIG. 11A is a perspective view of a portion of an illustrative display frame assembly with a hole through which a screw is passed to attach a weldable nut in accordance with an embodiment.
Figure 11B:
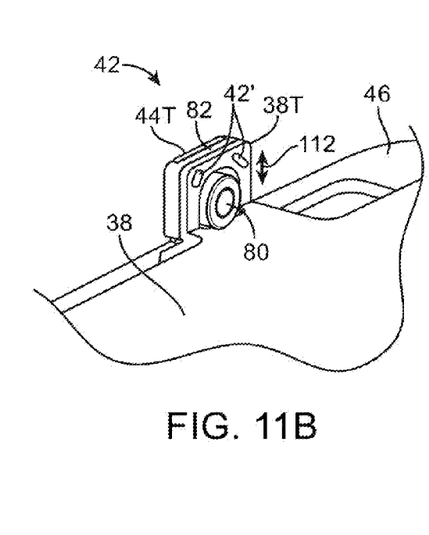
FIG. 11B is a perspective view of the display frame assembly and weldable nut of FIG. 11A being welded to a midplate in accordance with an embodiment.
Figure 11C:
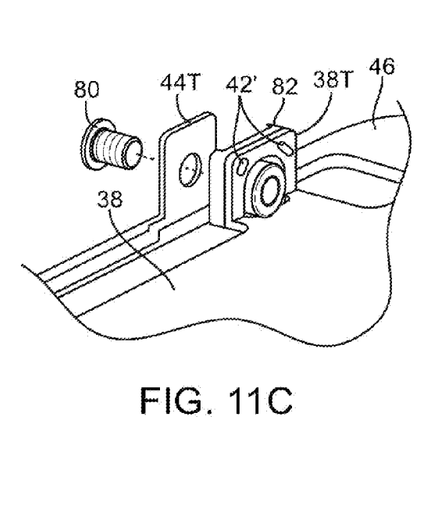
FIG. 11C is a perspective view of a portion of the illustrative display frame assembly and midplate of FIG. 11B illustrating how a screw may be removed to detach the weldable nut and midplate from the display frame assembly in accordance with an embodiment.

FIGS. 11A, 11B, and 11C illustrate the process of forming and removing a connection based on a welded nut (e.g., a configuration of the type shown in FIG. 6). As shown in FIG. 11A, frame assembly 48 is initially formed by overmolding plastic frame material 46 over frame 44 so that frame tab 44T protrudes outwards from material 46. Nut 82 may then be attached to frame tab 44T using screw 80. As shown in FIG. 11B, midplate 38 may then be accurately positioned relative to frame 44 by moving midplate 38 vertically along dimension 112 (and, if desired, horizontally) using computer-controlled positioners such as positioners 56 and 58 of FIG. 4. After alignment, weld 42' between tab 38T of midplate 38 and nut 82 on frame tab 44T may be formed (e.g., using welding equipment 52 of FIG. 4). Because nut 82 is already attached to frame 44 when weld 42' is formed, the use of a screw as part of the connection does not introduce uncertainty into the accuracy of the connection. If rework or repair is desired, screw 80 may be unscrewed from nut 82 as shown in FIG. 11C.

Figure 12A:
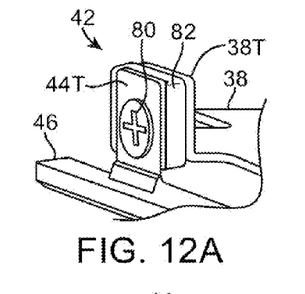
FIG. 12A is a perspective view of a portion of an illustrative display frame assembly to which a weldable nut has been attached with a screw and that has been coupled to a midplate by welding the midplate to the weldable nut in accordance with an embodiment.
Figure 12B:
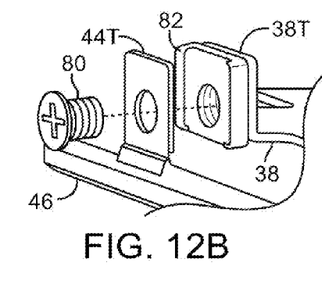
FIG. 12B is a perspective view of the display frame assembly, weldable nut, and midplate of FIG. 12A showing how a screw may be removed from the weldable nut to remove the midplate for rework in accordance with an embodiment.
Figure 12C:
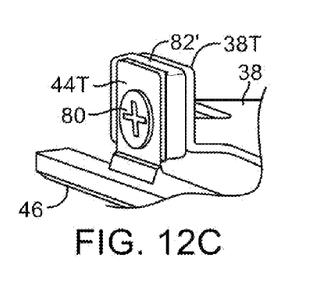
FIG. 12C is a perspective view of a portion of the illustrative display frame assembly of FIG. 12B following rework operations in which a defective midplate has been replaced with a defect-free replacement midplate in accordance with an embodiment.

FIGS. 12A, 12B, and 12C show how a nut-based configuration for connection 42 may be reworked. Initially, connection 42 of FIG. 12A is formed by screwing nut 82 to tab 44T. Following accurate alignment between midplate 38 and nut 82 (and therefore alignment between midplate 38 and frame 44), midplate 38T is welded to nut 82. When rework or repair is desired, screw 80 is removed from nut 82 so that nut 82 and midplate 38 can be removed (FIG. 12B). Following rework or repair operations, a new nut 82' may be attached to tab 44T and a new midplate 38 may be aligned and welded to nut 82' as shown in FIG. 12C. Original nut 82 is attached to original midplate 38 by welds 42' and is therefore discarded when the original midplate is discarded, but a fresh nut 82 and a fresh midplate 38 can be attached to frame 44 once rework or repair operations are complete.

Figure 13A:
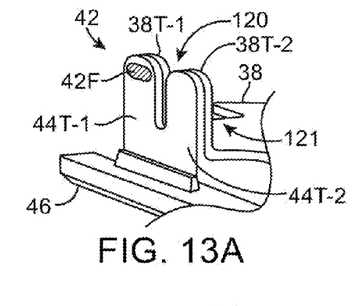
FIG. 13A is a perspective view of a portion of an illustrative display frame with a pair of weldable tabs that has been coupled to a midplate by welding in accordance with an embodiment.
Figure 13B:
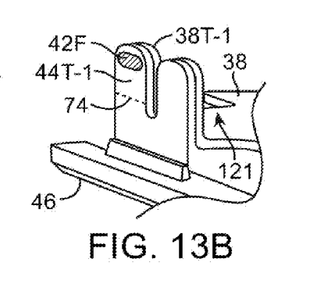
FIG. 13B is a perspective view of the display frame assembly and midplate of FIG. 13A showing where a display frame tab may be cut so that the midplate can be removed during rework operations in accordance with an embodiment.
Figure 13C:
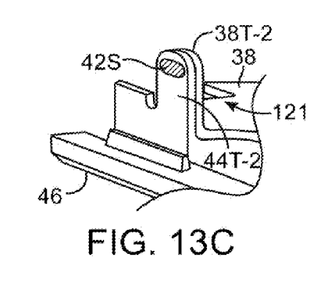
FIG. 13C is a perspective view of a portion of the illustrative display frame assembly of FIG. 13B following rework operations in which a defective midplate has been replaced by a defect-free replacement midplate in accordance with an embodiment.

FIGS. 13A, 13B, and 13C show how a weld-based configuration for connection 42 may be reworked. In the illustrative arrangement of FIGS. 13A, 13B, and 13C, midplate 38 has two parallel tabs 38T-1 and 38T-2 and frame 44 has two corresponding parallel tabs 44T-2 and 44T-2. The parallel midplate tabs are separated by slot 120 and the parallel frame tabs are separated by slot 120. After placing midplate 38 in a desired position with respect to frame 44, weld 42F of FIG. 13A is used to weld tab 44T-1 to tab 38T-1 and thereby accurately secure midplate 38 to frame 44. When it is desired to perform rework or repair operations, the tips of tab 44-1 and welded tab 38T-1 may be cut away along cut line 74, as shown in FIG. 13B. Cutting equipment such as the equipment of FIG. 5 may be used to remove the undesired connection between frame 44 and midplate 38. As shown in FIG. 13C, after component 40 on midplate 38 has been repaired or after other desired rework or repair operations have been completed, midplate 38 can once again be aligned with respect to frame 44 and welded to frame 44 using weld 42S on spare tabs 44T-2 and 38T-2. The presence of the slots between the tabs allows for clearance at the end of the cutting tool used to form cut 74 and provides a smooth, burr-less edge tab along the side after rework.

Figure 14A:
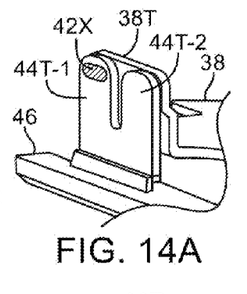
FIG. 14A is a perspective view of a portion of an illustrative display frame with a pair of weldable tabs that has been coupled to a midplate by welding a first of the tabs to the midplate in accordance with an embodiment.
Figure 14B:
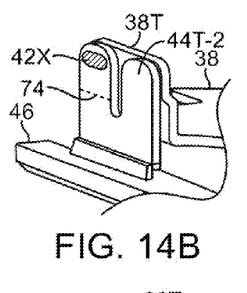
FIG. 14B is a perspective view of the display frame assembly and midplate of FIG. 14A showing where the first display frame tab may be cut so that the midplate can be removed during rework operations in accordance with an embodiment.
Figure 14C:
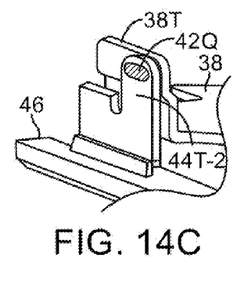
FIG. 14C is a perspective view of a portion of the illustrative display frame assembly of FIG. 14B following rework operations in which a defective midplate has been replaced by a defect-free replacement midplate by removing the first display frame tab and welding a second of the pair of weldable tabs to the midplate in accordance with an embodiment.

With the illustrative configuration of FIGS. 14A, 14B, and 14C, a new midplate is used when performing rework or repair operations. Initially, after midplate 38 has been aligned with respect to frame 44, weld 42X is used to weld tab 44T-1 to tab 38T on midplate 38 as shown in FIG. 14A. When it is desired to perform rework or repair operations, the weld between tab 44T-1 and tab 38T can be removed by cutting along cut line 74 of FIG. 14B using cutting equipment of the type shown in FIG. 5. Following desired rework or repair operations, a new midplate 38 may be aligned with respect to frame 44. New weld 42Q of FIG. 14C may then be used to attach frame tab 44T-2 to tab 38T of midplate 38. FIGS. 14A, 14B, and 14C show how midplate 38 may be provided with a recessed portion behind tab 38T-1 such as relief 121. In the absence of relief 121, there would be a potential for cutting operations along cut 74 (e.g., laser cutting operations) to re-weld midplate 38 to the remaining portion of tab 44T-1. By spacing tab 44T-1 and midplate 38 away from each other using relief 121, a cutting tool such as a laser may be used to cut off the frame tab without risk of re-welding the frame tab to the midplate.

Figure 15A:
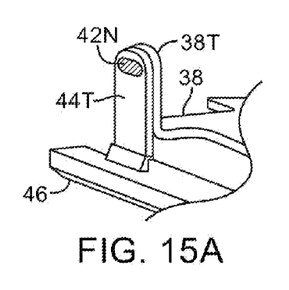
FIG. 15A is a perspective view of a portion of an illustrative display frame with a weldable tab that has been welded to a midplate in accordance with an embodiment.
Figure 15B:
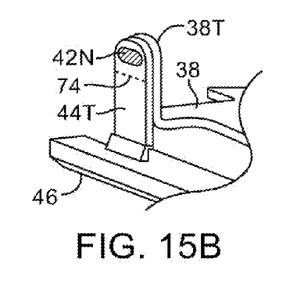
FIG. 15B is a perspective view of the display frame assembly and midplate of FIG. 15A showing where the display frame tab may be cut so that the midplate can be removed during rework operations in accordance with an embodiment.
Figure 15C:
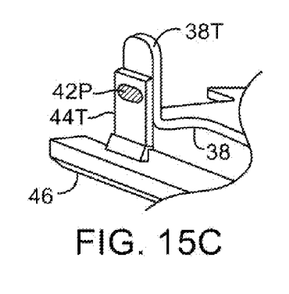
FIG. 15C is a perspective view of a portion of the illustrative display frame assembly of FIG. 15B following rework operations in which a defective midplate has been replaced by a defect-free replacement midplate by removing a tip portion of the display frame tab and welding a lower portion of the display frame tab to the midplate in accordance with an embodiment.

FIGS. 15A, 15B, and 15C illustrate another approach for attaching midplate 38 to frame 44. After aligning midplate 38 with respect to frame 44, weld 42N of FIG. 15A may be used to attach frame tab 44T to midplate tab 38T. FIG. 15B shows how weld 42N may be cut away along cut line 74 (e.g., using cutting equipment of the type shown in FIG. 5) when it is desired to perform rework or repair operations. Not all of tab 44T is cut away, so the lower portions of tab 44T remains for subsequent welding. FIG. 15C shows how a fresh midplate 38 may be attached to the remaining portion of tab 44T after rework or repair operations. As shown in FIG. 15C, new weld 42P may be formed at the portion of tab 44T that was not cut away during the operations of FIG. 15B (i.e., a portion of tab 44T that was not removed when the cut along cut line 74 was formed). If desired, the original midplate may be welded to the portion of tab 44T that remains (e.g., using the lower portion of original midplate tab 38T).

Figure 16:
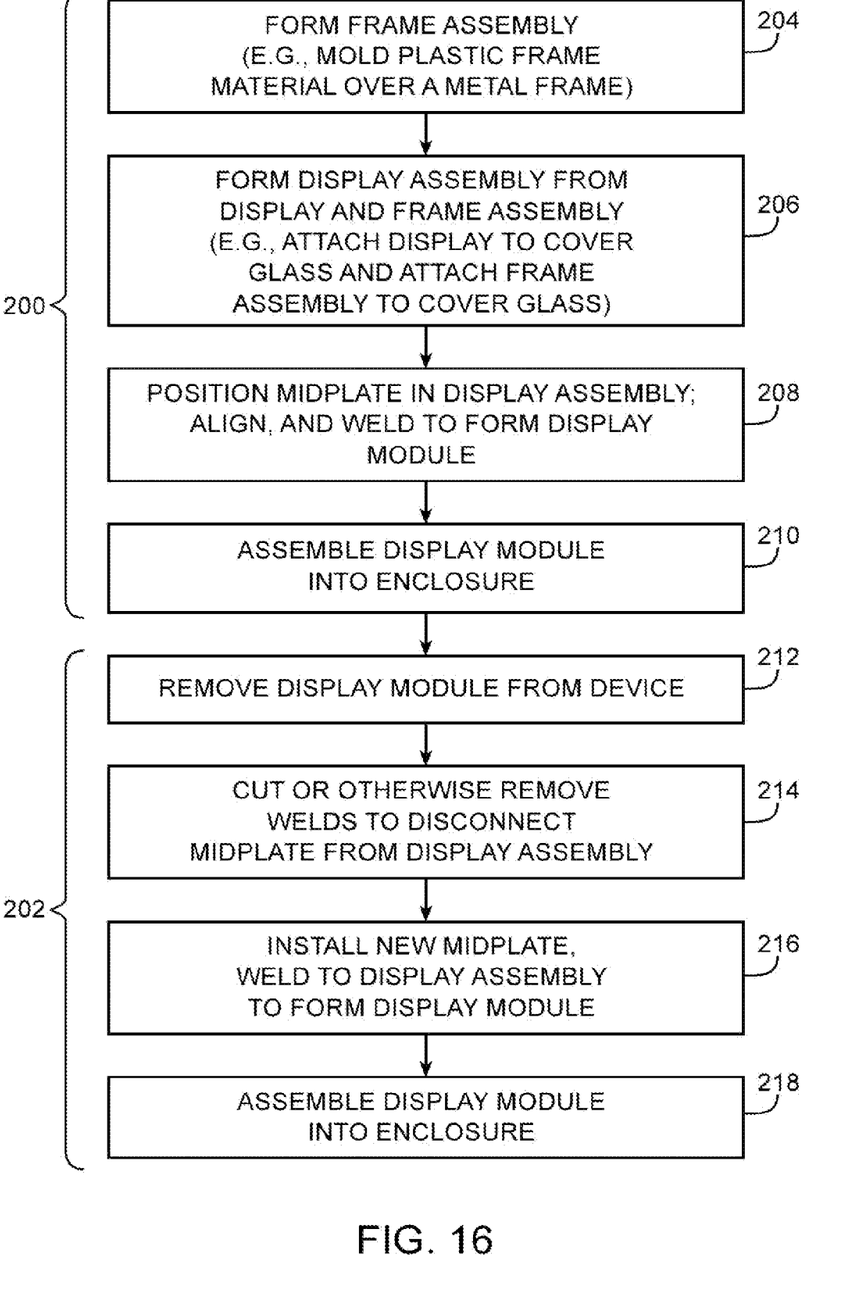
FIG. 16 is a flow chart of illustrative steps involved attaching a midplate to structures in a device housing such as display assembly structures and illustrative steps involved in performing rework operations in accordance with an embodiment.

Illustrative operations in forming electronic devices that have connections 42 between midplates 38 and frames 44 or other pairs of aligned internal housing structures in housing 12 (e.g., any other electronic device structures that include a first member such as a first metal member that is aligned and welded to a second member such as a second metal member) are shown in the flow chart of FIG. 16. The operations of steps 200 of FIG. 16 may be used to create electronic device 10. The operations of step 202 involved performing rework or repair operations on device 10.

At step 204, frame assembly 48 may be formed by molding plastic structures 46 onto metal frame 44 or forming other frame assembly structures. Frame assembly 48 (i.e., molded plastic structures and metal frame 44) may have a rectangular opening. The opening in frame assembly 48 may be configured to receive a component such as display 14. Tabs 44 and other structures for facilitating attachment of midplate 38 to frame assembly 48 may be included on frame 44.

At step 206, a display assembly may be formed by mounting display 14 in frame assembly 48. Adhesive 50 or other attachment mechanisms may be used in mounting display 14 in frame assembly 48.

At step 208, midplate 38 may be positioned at a desired location relative to frame 44 and the other portions of the display assembly. Computer-controlled positioners such as positioners 56 and 58 of FIG. 4 may be used in aligning midplate 38 and frame 22. Sensors such as a camera, laser-based position sensors, or other sensors 51 may be used to provide the computer-controlled positioners with real-time feedback so that midplate 38 and frame 22 may be positioned accurately with respect to each other. Once a desired alignment has been achieved between midplate 38 and the display assembly (i.e., once midplate 38 and frame 44 have been aligned), welding equipment or other equipment for forming connections 42 between frame 44 and midplate 38 may be used to form connections 42 that attach midplate 38 to frame 44, thereby forming a display module.

The display module and other components of device 10 may be assembled into device housing 12 at step 210 to form device 10. Computer-controlled assembly equipment and/or manual assembly techniques may be used in installing the display module in device housing 12.

Following assembly of device 10, device 10 may be tested. Test results acquired during manufacturing may reveal whether device 10 is functioning properly. An end user of device 10 may also determine whether device 10 is functioning properly when using device 10 in the field. If a defect is detected during testing or by a user in the field, device 10 can be reworked or repaired using the operations of steps 202.

At step 212, the display module that was formed at step 208 may be removed from housing 12 of device 10. Rework or repair operations (e.g., rework or repair to fix a faulty component 40 on midplate 38 or other rework or repair operations) may be facilitated by removing midplate 38 from the display assembly at step 214. Midplate 38 may be removed from the display assembly by forming cut lines such as cut lines 74 to cut away welds, by removing screws such as screw 80, or by otherwise disconnecting connections 42 to release midplate 38 from frame 44.

At step 216, a repaired or new midplate (and any associated repaired or fresh components such as component 40) may be attached to frame 44. For example, new welds may be formed, screws 80 and welds may be used to form a connection with a new nut, adhesive may be used in forming a connection, new heat stake connections may be formed, etc. Attaching the repaired or new midplate creates a defect free display module for device 10. The defect free display module may be assembled into housing 12 to form a repaired version of device 10 at step 218.

The alignment of a midplate and display frame and associated rework and repair operations have been described as an example. In general, any housing structures or other structures in electronic device 10 (e.g., any pair of metal structures or other structures) can be attached using connections 42 and can be likewise reworked or repaired.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing;
   a display;
   a display frame that receives the display, wherein the display frame has first and second opposing sides; and
   a midplate within the housing that is attached to the display frame with a weld, wherein the midplate extends behind the display from the first side of the display frame to the second side of the display frame.

2. The electronic device defined in claim 1 wherein the midplate has two parallel tabs separated by a slot and wherein the weld is formed between one of the two parallel tabs and the display frame.

3. The electronic device defined in claim 2 wherein the display frame has a display frame tab that is welded to the midplate by the weld.

4. The electronic device defined in claim 3 further comprising plastic overmolded over the display frame.

5. The electronic device defined in claim 4 wherein the plastic and the display frame form a display frame assembly that is attached to the display with adhesive.

6. The electronic device defined in claim 1 wherein the midplate has a tab, wherein the display frame has two parallel tabs separated by a slot, and wherein the weld is formed between one of the two parallel tabs of the display frame and the tab of the midplate.

7. The electronic device defined in claim 6 further comprising plastic overmolded over the display frame to form a display frame assembly to which the display is attached with adhesive.

8. An electronic device, comprising:
   a housing;
   a display;
   a display frame that receives the display;
   a midplate within the housing that is attached to the display frame with a weld;
   a screw; and
   a nut that is attached to the display frame with the screw, wherein the weld is formed between the nut and the midplate.

9. The electronic device defined in claim 8 wherein the display frame has a tab, wherein a hole is formed in the tab, and wherein the screw passes through the hole.

10. The electronic device defined in claim 9 wherein the midplate has a tab and wherein the weld is formed between the nut and the tab of the midplate.

11. The electronic device defined in claim 10 further comprising a plastic structure that is overmolded over the display frame to from a display frame assembly that is attached to the display with adhesive.

12. An electronic device, comprising:
    a housing;
    a display;
    a display frame that receives the display;
    a midplate within the housing; and
    a plastic structure overmolded onto a portion of the midplate, wherein midplate is attached to the display frame with the plastic structure.

13. The electronic device defined in claim 12 further comprising adhesive that attaches the display frame to the plastic structure.

14. The electronic device defined in claim 13 wherein the portion of the midplate onto which the plastic structure is overmolded is a prong.

15. The electronic device defined in claim 12 wherein the plastic structure has a heat stake that is received within an opening in the display frame.

16. The electronic device defined in claim 15 wherein the portion of the midplate onto which the plastic structure is overmolded is a prong and wherein the display frame has a tab in which the opening is formed.

17. A method, comprising:
    mounting a display in an electronic device display frame having first and second opposing sides; and
    attaching a housing midplate to the display frame using a permanent connection, wherein the housing midplate extends behind the display from the first side of the electronic device display frame to the second side of the electronic device display frame.

18. The method defined in claim 17 further comprising:
    removing the permanent connection during repair operations on an electronic device containing the electronic device display frame.

19. The method defined in claim 18 wherein the permanent connection comprises a weld between a tab on the electronic device display frame and the housing midplate.

20. The method defined in claim 19 wherein removing the permanent connection comprises cutting away a tip portion of the tab to remove the weld from the electronic device display frame, the method further comprising welding a replacement midplate to the tab after removing the weld.

* * * * *